United States Patent [19]
Reiners

[11] 4,310,468
[45] Jan. 12, 1982

[54] EXTRACTION OF OIL FROM VEGETABLE MATERIALS

[75] Inventor: Robert A. Reiners, Hinsdale, Ill.

[73] Assignee: CPC International Inc., Englewood Cliffs, N.J.

[21] Appl. No.: 219,779

[22] Filed: Dec. 23, 1980

[51] Int. Cl.[3] .......... C09F 5/02; C11B 1/10
[52] U.S. Cl. .......... 260/412.4; 260/412.8
[58] Field of Search .......... 260/412.4, 412.8, 428.5

[56] References Cited

U.S. PATENT DOCUMENTS

| | | | |
|---|---|---|---|
| 2,325,328 | 7/1943 | Lachle . | |
| 2,605,271 | 7/1952 | Hunn et al. . | |
| 3,786,078 | 1/1974 | Finley et al. . | |
| 4,246,184 | 1/1981 | Pressick et al. | 260/412.4 |
| 4,255,346 | 3/1981 | Kock | 260/412.4 |

FOREIGN PATENT DOCUMENTS

| | | |
|---|---|---|
| 763968 | 7/1967 | Canada . |
| 2722245 | 11/1978 | Fed. Rep. of Germany . |
| 1184345 | 3/1970 | United Kingdom . |

OTHER PUBLICATIONS

Minasyan, et al., "Effect of Various Factors on Extraction of Corn Oil", Masloboino-Zhir. Prom. 38 (#1), pp. 8-10 (1972).

*Primary Examiner*—John F. Niebling
*Attorney, Agent, or Firm*—Stanley M. Parmerter

[57] ABSTRACT

A process is provided for the extraction of oil from undried, finely-divided vegetable material. This process employs total immersion of moist solid in a solvent without production of emulsions or contamination of the miscella with finely-divided solids.

7 Claims, No Drawings

EXTRACTION OF OIL FROM VEGETABLE MATERIALS

FIELD OF THE INVENTION

This invention relates to the extraction of oil from vegetable materials—particularly those with relatively high moisture content.

BACKGROUND OF THE INVENTION

There are numerous known methods for recovering oil from vegetable materials. One technique in commercial use involves continuously pressing the vegetable material at low moisture content to expel oil. A pretreatment steaming of the vegetable material is frequently employed to facilitate the pressing operation.

Although mechanical pressing is a relatively simple procedure, it removes only part of the oil from such vegetable materials as corn germ obtained from the corn wet-milling process. The corn wet-milling process needs no further description, because it is well known and has been extensively described in the literature. See, for example, the chapter entitled "Starch", by Stanley M. Parmerter, beginning on page 672 of Volume 18 of *Kirk-Othmer Encyclopedia of Chemical Technology, Second Edition,* Interscience Publishers, a division of John Wiley & Sons, Inc., New York, London, Sydney, Toronto (1969). For this reason, a combination of continuous screw pressing followed by solvent extraction of the pressed meal is frequently employed on high oil-content vegetable materials, i.e., those containing more than 25% oil.

One disadvantage of the prepressing-solvent extraction technique for processing high oil-content materials is the high cost of the equipment. Not only must continuous screw presses be purchased and maintained but also a full-scale solvent extractor must be installed.

A second problem with the prepressing-solvent extraction technique relates to oil quality. That oil which remains in the pressed cake has been exposed to the air while at elevated temperatures. As a result, the oil extracted from the pressed cake is dark colored and difficult to refine to a light colored oil.

One direct extraction method devised to overcome the drawbacks of the costly prepressing-solvent extraction operation is disclosed in Canadian Pat. No. 763,968. In this process, low-moisture content vegetable material is comminuted to pass a 20-mesh screen and then slurried with hexane at 175°-260° F. under pressure. The extract is separated and washed from the solids in a countercurrent manner in a series of hydrocyclones. Although this treatment results in substantially complete removal of oil from the vegetable material, the extraction must be carried out in pressure vessels and a "fines" problem is encountered. When the material is comminuted to pass a 20-mesh screen, some very fine particles are formed. Many of these are only 1-2 microns in diameter. On passage through the hydrocyclones, these fines remain with the extract and appear in the desolventized crude oil. The crude oil must then be filtered before it can be further processed. This is an expensive step because of the large amount of solids held in the oil, and the difficulty of removing these finely-divided solids from the oil.

Another process for the direct extraction of oil from corn germ is disclosed in U.S. Pat. No. 3,786,078. The essential steps of this process are: (1) drying the corn germ to about 2% moisture, (2) finely grinding the dry material, (3) hydrating the ground material, (4) flaking the moist, ground material, and (5) extracting the flakes with solvent in a conventional percolation extractor. In this case, as in the previous one, the ground germ undoubtedly contains much fine material but most of the fines are bound into the flakes on passage through the flaking rolls. The flaking step is critical and unless this is done correctly, poor extraction results. If the moisture content is too low or if the flakes are too thin, the flakes disintegrate giving fines which slow percolation of the solvent and interfere with oil extraction. If the moisture content is too high or if the flakes are too thick, solvent penetration into the flakes is impeded resulting in poor extraction.

In U.S. Pat. No. 4,277,411, a process is disclosed which involves shredding the moist vegetable material by passing it between closely-set smooth rolls to rupture the oil-containing cells without expelling the oil from them. The compressed material is dried and the oil is extracted with an oil solvent. While this procedure overcomes many of the problems associated with earlier processes, it gives material of very low bulk density which is hard to handle on a large scale and which requires bulky oil extracting equipment. U.S. Pat. No. 4,246,184 also describes an improved method for preparing oil-bearing vegetable materials for extraction. This method comprises comminuting the vegetable material, forming agglomerates of the finely-divided material containing between about 20% and about 55% water by weight and drying the agglomerates to a moisture content of less than 15% before they are extracted. Although this method is satisfactory in producing an extract that contains very few fines, it does require a drying and re-forming step before the extraction.

U.S. Pat. No. 4,277,411 specifically shows that oil is incompletely extracted from undried corn germ by the process disclosed in that application unless the germ is dried before extraction. For other oil extraction processes in current use, it is necessary to dry the material to a comparatively low moisture content before the extraction. Such drying processes are not entirely satisfactory because they cause hydrolysis of a portion of the oil to free fatty acids which must be removed from the oil in a subsequent refining step. In addition, the drying processes needed to remove the water tend to accelerate oxidation of the oil causing additional oil loss and requiring further refining operations.

Pending U.S. application, Ser. No. 219,772 filed Dec. 23, 1980, discloses an aqueous extraction process for obtaining oil from finely-ground corn germ. This method gives oil of excellent quality which requires very little refining. However, even this method suffers from the drawback that an appreciable amount of the oil remains in the wet residues from the process.

SUMMARY OF THE INVENTION

It is an object of this invention to provide a new oil extraction process which does not require the use of expensive expelling equipment.

It is another object of this invention to provide an oil extraction process which does not require a flaking process with its attendant need for careful control of flaking conditions.

It is still another objective of this invention to provide a direct oil extraction process which gives a miscella without the undesirable fines encountered in many previous direct extraction processes.

A further object of this invention is to provide an oil extraction process which can be used directly on moist vegetable material without the need for the expensive preliminary drying step with its attendant oil loss through hydrolysis and oxidation of the oil.

These objects are realized by the process of this invention which is now described.

In one embodiment of the invention, finely-divided, undried corn germ obtained from the corn wet-milling process, containing at least about 40% water by weight, is dispersed in an oil solvent to give a solid-solvent dispersion. The oil is extracted from the solid-solvent dispersion with more oil solvent. Finally, the oil-containing solvent is separated from the insoluble material, and the oil is recovered from the oil-containing solvent.

Wet decanter residues and sludge obtained from the aqueous extraction of oil from corn germ can be used as the finely-divided corn germ in this process.

In a further embodiment of this invention, the process is applied to the extraction of oil from finely-divided, undried coconut meats.

DESCRIPTION OF PREFERRED EMBODIMENTS

The process of this invention can be applied to various oil-bearing vegetable materials of relatively high oil content. This novel procedure is particularly well suited to the extraction of oil from undried corn germ obtained from the corn wet-milling process. Accordingly, the description which follows is largely exemplary with respect to this particular vegetable seed material.

In the practice of this invention, undried vegetable matter of high moisture content is used. In the case of corn germ from the corn wet-milling process, the preferred amount of water is from about 40% to about 60% by weight. The most preferred amount is from about 50% to about 55% water by weight. In the case of undried coconut meats, the moisture content is somewhat lower, usually about 40% by weight.

One source of corn germ suitable for use in this process is the decanter residue and sludge obtained from the aqueous extraction of oil from corn germ. The aqueous extraction process is disclosed in a pending U.S. application, Ser. No. 219,772 filed Dec. 23, 1980, which disclosure is incorporated herein by reference. This process gives a residue of finely-ground material which contains about 5% corn oil by weight on a dry solids basis. It also contains about 75% water by weight. There is also a sludge which contains additional oil. Oil can be extracted from the combined residue and sludge by the method of the present invention when it contains from about 50% to about 80% moisture by weight.

Comminution is accomplished by any conventional means for reducing the size of particles, such as a hammer mill or other conventional mill. An Urschel COMITROL (Urschel Laboratories Company, Valparaiso, Ind.) fitted with a microcut head is particularly suited for this purpose. The particles should be of such a size that the oil can be readily extracted from them. It is desirable that the residual meal after extraction contains less than about 5% oil, preferably less than 2% oil. In the case of corn germ, the particles should be so finely divided that more than about 50%, preferably more than about 80%, will pass through a No. 100 U.S. Standard sieve.

The comminuted material is next mixed with an oil solvent. Typically, the oil solvent is a liquid hydrocarbon such as hexane. Mixing is accomplished by any means that provides intimate contact between the solid and solvent. Circulation through a colloid mill, a homogenizer or even a centrifugal pump may be used to perform this step.

The mixture of liquid and solid material can be separated at this stage. Optionally, the mixture is subjected to a second comminution step to promote more complete extraction of oil from the solid.

Separation of the liquid extract from suspended solid material may be achieved by filtration or centrifugation. If a centrifuge is used, it is desirable to choose operating conditions so that the water present is retained in the solid and is not squeezed out to form a separate liquid layer. The solid is mixed with fresh solvent and the separation step is repeated as many times as necessary for oil extraction. Economical large-scale extractions of the mixture may be accomplished by passing the slurry through hydrocyclones. The oil solvent is passed countercurrently through the same system. A typical arrangement for a hydrocyclone countercurrent washing system is disclosed in U.S. Pat. No. 2,840,524.

After extraction has been completed, the residual vegetable material will generally exhibit an oil content of less than 5%, preferably less than about 2%, by weight. This material, which has a high protein content, may be freed of solvent by evaporation and used as animal feed or the like. Since the vegetable material has not been dried, the protein is not denatured and is of high quality.

The oil is separated from the solvent using conventional equipment. The oil may be further treated as desired using any one, or a combination, of the customary steps of refining, bleaching and deodorizing to produce a high grade vegetable oil.

Although the foregoing process has been described chiefly in terms of a complete process for extracting the oil from essentially naturally occurring forms of vegetable material, it is not so limited. This process may be used in combination with other conventional steps in oil extraction and by-product recovery.

Throughout the present process and any preliminary steps of treatment of the vegetable material, it is preferred that conditions deleterious to the oil in the vegetable material be minimized or avoided. Of these conditions, elevated temperatures are the most serious. Such temperatures, unless for a very brief time, can cause the quality of the oil to suffer. In view of this, it is generally desirable to maintain moderate temperatures, to limit exposure to elevated temperatures to as short a time as possible and to maintain an inert atmosphere throughout the processing of the vegetable material and its oil.

The following examples illustrate certain embodiments of the present invention. Unless otherwise stated, all proportions and percentages are provided on the basis of weight.

EXAMPLE I

Undried, full-fat corn germ (about 55% moisture) obtained from the wet milling of corn was ground in a 12.7-cm diameter micropulverizer type SH stainless steel hammer mill made by Pulverizing Machinery Company, Summit, N.J. The mill was operated at 8800 rpm. The germ was ground in two passes, first through a 3.2-mm screen, then through a 1.6-mm screen. The ground wet germ was slurried in an equal weight of hexane. The slurry was passed twice through a Manton-Gaulin homogenizer, type 15M 8TA, made by the Manton-Gaulin Manufacturing Company, Inc., Everett, Mass., operating at 422 kg/cm$^2$. The homogenized slurry was extracted 7 times with hexane. Separation was made in an International No. 2 centrifuge manufactured by the International Equipment Company, Boston, Mass. The centrifuge was brought to 1500 rpm before the motor was turned off. The extract was then decanted from the solid. The volume of hexane added for each extraction was equal to the volume of extract separated in the previous extraction. A brilliant clear extract was obtained. Residual oil content of the solid was 1.2%.

Residual oil was determined by the Spex mill method. In this method, the sample is placed with carbon tetrachloride in a small ball mill (Spex mixer mill, Catalog No. 8000) made by Spex Industries, Inc., Metuchen, N.J., and shaken thoroughly to disintegrate the meal. The ground slurry is heated for 30 minutes under reflux with carbon tetrachloride and filtered. The oil content of the filtrate is determined after evaporation of the solvent.

Separation between the wet germ and hexane is so rapid that gravity separation is feasible in dilute systems. An 8% (dry substance) slurry could be separated in a separatory funnel.

EXAMPLE 2

The process of Example 1 was repeated except that the wet corn germ was ground through an Urschel Laboratories Model 1700 COMITROL mill made by the Urschel Laboratories Company, Valparaiso, Ind., using an 180084-2 microcut head with the impellor rotating at 12,000 rpm. The residual oil content of the solid was 1%.

EXAMPLE 3

The process of Example 2 was repeated with other corn germ samples using various microcut heads in the COMITROL mill. Extraction results and extraction conditions are reported in Table I.

Good oil extraction was achieved provided that the ground corn germ is further milled in hexane slurry (note Runs 2 and 3). These results also indicate that the more finely-ground material is more completely extracted by this process.

TABLE I

EXTRACTION OF URSCHEL MILLED CORN GERM

| Run No. | Milling[a] | Cumulative Particle Size Distribution[b] % Through: 40 Mesh (420 μ) | 70 Mesh (212 μ) | 100 Mesh (147 μ) | 140 Mesh (106 μ) | Moisture Content % | Mixing Conditions During Extraction | Residual Oil, % d.b. (F-15b) |
|---|---|---|---|---|---|---|---|---|
| 1 | Through 140084-10 head, then 200084-1 head | 98.2 | 83.0 | 74.0 | 67.1 | 56.2 | Hand[c] | 14.3 |
| | | (98.6) | (79.3) | (68.8) | (64.3) | | Mechanical[d] | 10.2 |
| 2 | Sample 1 through Manton-Gaulin Homogenizer once at 6000 psi | (100.0) | (95.4) | (88.9) | (80.4) | 56.2 | Hand[c] | 2.9 |
| | | | | | | | Mechanical[d] | 1.8 |
| 3 | Sample 2 through Manton-Gaulin Homogenizer again | (100.0) | (98.7) | (95.7) | (91.1) | 56.2 | Hand[c] | 1.5 |
| | | | | | | | Mechanical[d] | 0.9 |
| 4 | Through 180084-2 head, then 200084-1 head | 99.8 | 89.5 | 79.2 | 69.8 | 52.5 | Hand[c] | 7.4 |
| | | | | | | | Mechanical[d] | 7.3 |
| 5 | Through 180084-2 head, then twice through 200084-1 head | 100.0 | 94.0 | 83.9 | 73.1 | 51.6 | Hand[c] | 5.2 |
| | | | | | | | Mechanical[d] | 5.0 |

[a]Undried corn germ samples ground through Urschel COMITROL mill fitted with indicated heads and with impellor revolving at 9500 rpm. Ground germ put through Manton-Gaulin homogenizer as 15% (d.b.) slurry in hexane.
[b]Wet ground germ dispersed in water and washed through screens. Parenthetical values obtained by screening extracted samples. The hexane-wet extracted sample was dispersed in water and washed through screens.
[c]Dispersed 40 g wet germ in 100 ml hexane by stirring 30 sec on high in qt Waring Blender. In 6 succeeding extractions hexane mixed into residue by hand. Separation at 500 × g for 1 sec.
[d]Extracted as above but mixed hexane and residue in qt Waring Blender for 15 sec on low speed for last 6 extractions.

EXAMPLE 4

The process of Example 2 was repeated except that the wet corn germ was twice ground through the Urschel mill equipped with a 20084-1 head with an impellor speed of 9500 rpm. The twice-ground germ, 55 kg, was mixed with 198 kg hexane by twice passing the slurry through a Tri-Homo Disperser Homogenizer, Model 2LA, manufactured by Patterson Industries, Inc., East Liverpool, Ohio. The liquid extract was separated from the solid by passing the mixture through a hydrocyclone, DorrClone P-50-A, made by Dorr-Oliver, Inc., Stamford, Conn. The supply pressure was 0.84 kg/cm$^2$. Extraction of the solid was repeated 7 times. In each case, the amount of fresh hexane used was equal to the weight of the extract separated in the previous extraction. The underflow from the final extraction was diluted with 0.63 parts of hexane and centrifuged in a solid-bowl, scroll-discharge centrifuge (P-660 Continuous Superdecanter, made by Sharples Corp., Philadelphia, Pa.) at 6000 rpm before residual oil was determined. Residual oil content of the solid was 3.2% (average of 2 runs).

EXAMPLE 5

Fresh coconut meats (50 grams) containing 41.6% moisture were shredded and then ground with 75 ml of hexane in a 1-quart Waring Blendor at high speed for 60 seconds. The solvent, containing oil, was separated from the solid by centrifuging at 1500 rpm for 1 second in a Model PR1 International centrifuge. This gives an average centrifugal force of about 500×g. Seven such extractions using fresh hexane each time reduced the residual oil content of the coconut meat to 2.5% by weight on a dry solids basis. The crude coconut oil was nearly water white and contained only 0.1% free fatty acids expressed as lauric acid. This contrasts with crude commercial coconut oil which normally contains about 5% free fatty acids.

Extractions were much less efficient, leaving 6.5% residual oil, when separations were made by gravity rather than using a centrifuge. Extractions were also less efficient when the residue after the first extraction was further extracted by shaking with hexane rather than by stirring at high speed in a Waring Blendor.

This example illustrates that the process is suitable for extracting oil from undried coconut meats, as well as from undried corn germ.

EXAMPLE 6

A sample of decanter residue from the aqueous extraction process described in pending U.S. application, Ser. No. 219,772, filed Dec. 23, 1980, was found to contain 74.3% moisture. Analysis showed that 5.9% of the dry material was oil. This residue without further grinding was extracted with seven portions of hexane as described for the extraction of the homogenized slurry of corn germ in Example 1. A clear miscella was obtained. The extracted residue contained only 0.5% oil by weight on a dry solids basis.

The extraction process was repeated using a combination of decanter residue and sludge obtained from the aqueous extraction of oil from corn germ. This mixture before extraction analyzed for 74.4% moisture and 15.6% oil by weight on a dry solids basis. Seven extractions with hexane again gave a clear miscella and left a residue containing only 0.4% oil by weight on a dry solids basis. The extractions in this example show that the process of this invention gives efficient removal of the oil from the combined residue and sludge obtained from the aqueous extraction of oil from corn germ.

Thus, it is apparent that there has been provided, in accordance with the invention, a process for the total immersion extraction of oil from high oil-bearing seeds that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A process for the extraction of oil from vegetable material consisting essentially of the steps of:

(a) dispersing a member selected from the group consisting of finely-divided, undried corn germ and finely-divided, undried coconut meats containing at least about 40% water by weight, in an oil solvent to give a solid-solvent dispersion;

(b) extracting oil from the solid-solvent dispersion with additional oil solvent;

(c) separating the oil solvent with oil from insoluble material; and (d) recovering the oil from the oil solvent with oil.

2. The process of claim 1 wherein the solid-solvent dispersion is subjected to a further comminuting step before the oil is extracted.

3. The process of claims 1 or 2 wherein the oil-bearing solvent is separated from the insoluble material by means of hydrocyclones.

4. The process of claims 1 or 2 wherein the finely-divided solid is dispersed in the oil solvent by means of a homogenizer.

5. The process of claims 1 or 2 wherein the oil solvent is hexane.

6. The process of claims 1 or 2 wherein the finely-divided corn germ is obtained from the corn wet-milling process and contains from about 40% to about 60% water by weight.

7. The process of claims 1 or 2 wherein the finely-divided corn germ is comprised of at least one member selected from the group consisting of decanter residue and sludge obtained from the aqueous extraction of oil from corn germ.

* * * * *